US011162437B2

(12) United States Patent
Gron, Jr. et al.

(10) Patent No.: US 11,162,437 B2
(45) Date of Patent: Nov. 2, 2021

(54) SINGLE ACTUATOR VALVE SEQUENCING IN CYLINDER DEACTIVATION AND HIGH-POWER DENSITY (HPD) BRAKING ENGINE ENVIRONMENTS

(71) Applicant: Jacobs Vehicle Systems, Inc., Bloomfield, CT (US)

(72) Inventors: G. Michael Gron, Jr., Granby, CT (US); Justin D. Baltrucki, Canton, CT (US)

(73) Assignee: Jacobs Vehicle Systems, Inc., Bloomfield, CT (US)

( * ) Notice: Subject to any disclaimer, the term of this patent is extended or adjusted under 35 U.S.C. 154(b) by 0 days.

(21) Appl. No.: 17/301,414

(22) Filed: Apr. 1, 2021

(65) Prior Publication Data
US 2021/0310424 A1 Oct. 7, 2021

Related U.S. Application Data (60) Provisional application No. 63/004,623, filed on Apr. 3, 2020.

(51) Int. Cl.
*F01L 1/34* (2006.01)
*F02D 13/04* (2006.01)
(Continued)

(52) U.S. Cl.
CPC ............... *F02D 13/04* (2013.01); *F01L 1/18* (2013.01); *F01L 1/26* (2013.01); *F01L 13/0005* (2013.01);
(Continued)

(58) Field of Classification Search
CPC ...... F02D 13/04; F02D 13/0215; F02D 13/06; F02D 2200/101; F01L 13/06; F01L 13/08;
(Continued)

(56) References Cited

U.S. PATENT DOCUMENTS 9,790,824 B2 10/2017 Baltrucki et al.
2013/0297191 A1* 11/2013 Gibson .................... F02D 9/02
701/112
(Continued)

FOREIGN PATENT DOCUMENTS

| JP | 2001280159 A | 10/2001 |
| JP | 2018145808 A | 9/2018 |
| WO | 2002095203 A1 | 11/2002 |

OTHER PUBLICATIONS

International Search Report for International Application No. PCT/IB2021/052761 dated Jun. 22, 2021, 3 pages.
(Continued)

*Primary Examiner* — Zelalem Eshete
(74) *Attorney, Agent, or Firm* — Moreno IP Law LLC (57) ABSTRACT

A system and associated methods for controlling valve motion in internal combustion engines provide a pulsing component for energizing a solenoid control valve in pulsatile fashion to cause a transient pressure change in a hydraulic network linking the control valve to a common, paired set of intake and exhaust main event deactivation mechanisms, which may be provided in respective valve bridges. The pressure change results in hydraulic deactivation of main event motion of the exhaust valve while avoiding deactivation of main intake event motion and thereby preserving intake main event valve motion, and supporting use of the intake main event motion for additional braking or other operations. The systems and methods are particularly suited for engine environments that employ cylinder deactivation (CDA) combined with high-power density (HPD) engine braking.

14 Claims, 5 Drawing Sheets

(51) Int. Cl.
  *F02D 13/06* (2006.01)
  *F01L 1/26* (2006.01)
  *F01L 13/06* (2006.01)
  *F02D 13/02* (2006.01)
  *F01L 1/18* (2006.01)
  *F01L 13/08* (2006.01)
  *F01L 13/00* (2006.01)

(52) U.S. Cl.
  CPC ............... *F01L 13/06* (2013.01); *F01L 13/08* (2013.01); *F02D 13/0215* (2013.01); *F02D 13/06* (2013.01); *F01L 2820/043* (2013.01); *F02D 2200/101* (2013.01)

(58) Field of Classification Search
  CPC . F01L 13/0005; F01L 1/26; F01L 1/18; F01L 2820/043
  See application file for complete search history.

(56) References Cited

U.S. PATENT DOCUMENTS

2020/0018244 A1    1/2020   Kolhouse et al.
2020/0088073 A1    3/2020   Baltrucki et al.

OTHER PUBLICATIONS

Written Opinion of the International Search Authority for International Application No. PCT/IB2021/052761 dated Jun. 22, 2021, 4 pages.

* cited by examiner (Prior Art)
FIG. 1

SINGLE ACTUATOR VALVE SEQUENCING IN CYLINDER DEACTIVATION AND HIGH-POWER DENSITY (HPD) BRAKING ENGINE ENVIRONMENTS

PRIORITY AND RELATED APPLICATIONS

This application claims priority to U.S. provisional application No. 63/004,623, filed on Apr. 3, 2020, titled "RAPID SEQUENCING OF PAIRED INTAKE AND EXHAUST VALVES WITH ONE ACTUATOR," the subject matter of which is incorporated herein by reference in its entirety.

FIELD

The instant disclosure relates generally to valve actuation systems in internal combustion engines and, in particular, to systems and methods for controlling the rapid sequencing of paired intake and exhaust valves. The disclosed systems and methods may be particularly suitable for sequencing valve motion in engine environments that combine cylinder deactivation and high-power density (HPD) engine braking. The disclosed systems and methods may also be particularly suitable for controlling paired intake and exhaust valves with a common, single actuator, such as a single high-speed solenoid valve.

BACKGROUND

Known valve actuation systems include auxiliary valve actuation systems that may utilize an auxiliary rocker arm and an auxiliary actuation motion source (e.g., a dedicated auxiliary cam) to provide auxiliary valve motion, which is motion that is in addition to main event valve motion. Main event valve motion refers to typical intake and exhaust valve motion that facilitates positive power production (i.e., the controlled intake, compression, combustion and exhaust strokes) in a typical four-stroke engine cycle in an associated cylinder. For example, such auxiliary valve actuation systems and associated valve motions may provide compression-release (CR) engine braking or any of a number of auxiliary valve events or variable main event timing variable valve time events (often referred to as variable valve actuation or VVA) such as, but not limited to, late intake valve closing (LIVC), early exhaust valve opening (EEVO), early intake valve closing (EIVC) and/or late intake valve opening (LIVO).

Various types of CR engine braking are known in the art. Generally, CR engine braking occurs when one or more engine cylinders are operated in an unfueled stated to essentially act as air compressors, thereby providing vehicle retarding power through the vehicle's drive train. So-called 2-stroke or high-power density (HPD) compression-release engine braking provides for two CR events for each cycle of the engine, which provides increased retarding power as compared to conventional CR systems where only a single CR event is provided for each cycle of the engine. In some versions of HPD braking systems, it is necessary to allow the main intake and exhaust valve actuation motions to be "lost" (not conveyed to the engine valves) in favor of the auxiliary valve actuation motions that implement the HPD engine braking.

As further known in the art, valve actuation systems may be configured to deactivate cylinders in an internal combustion engine. Typically, systems implementing cylinder deactivation (CDA) include mechanisms that permit the intake and exhaust valves to be decoupled from any valve actuation motion source, thereby preventing valve actuation of the intake and exhaust valves. Often, to the extent that such CDA systems are hydraulically actuated, one or more actuators (e.g., high speed solenoids) may be employed to control application of hydraulic fluid to the CDA mechanisms. Given the common feature of requiring decoupling of main intake and exhaust valve events, systems providing both 2-stroke HPD CR engine braking and CDA may be readily conceived.

Figure 1:
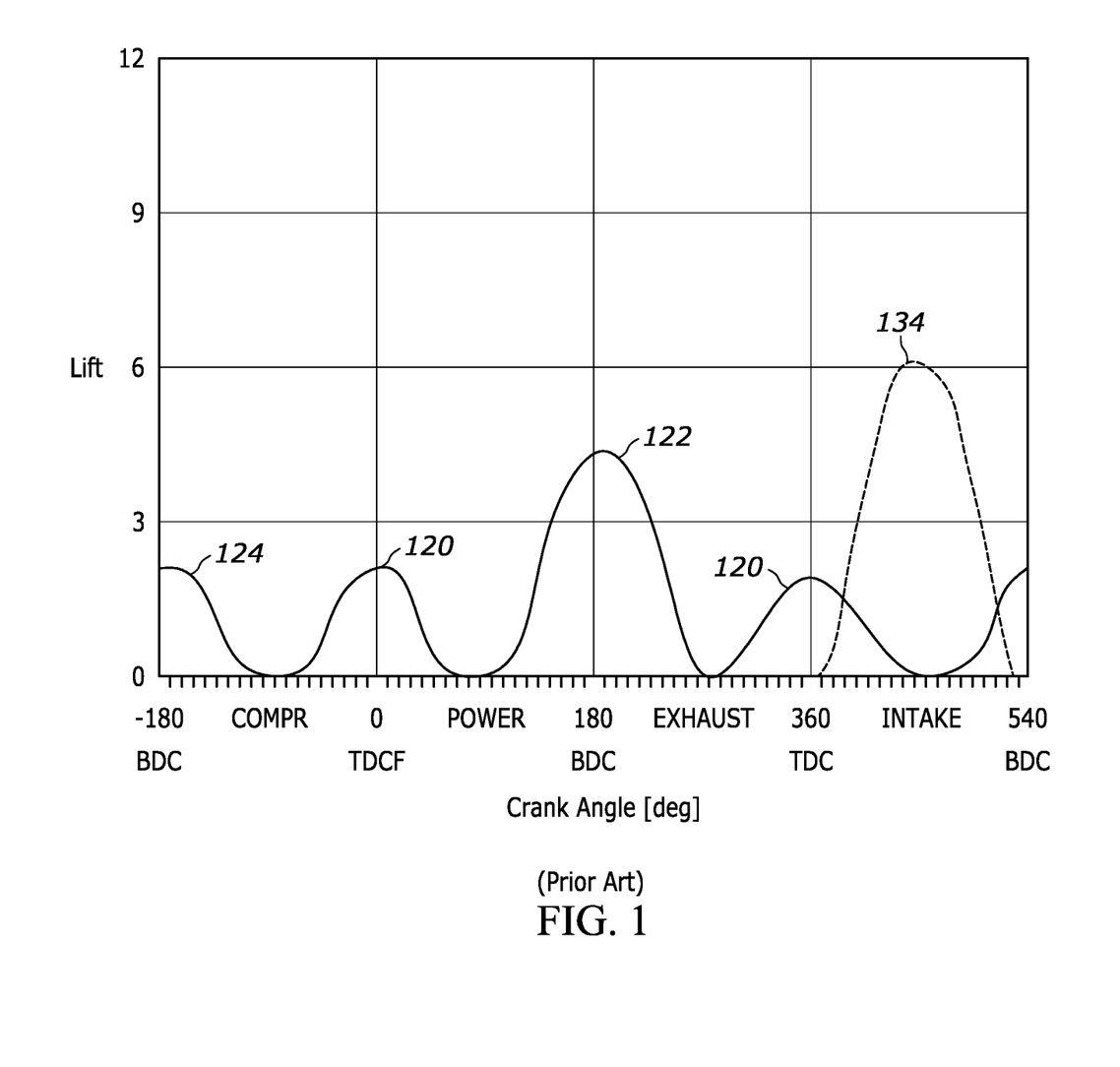
FIG. 1 is a graph that illustrates valve lift as a function of crankshaft angle in a prior art valve actuation sequence for providing 1.5-stroke HPD engine braking.

However, compatibility of CDA with other types of CR engine braking are not as readily achieved. With 2-Stroke HPD, cylinder deactivation mechanisms, also termed deactivators, eliminate the main intake and exhaust valve events, allowing the intake and exhaust braking rocker arms to provide two intake events, two CR events and two brake gas recirculation (BGR) events per cam rotation (engine cycle). In so-called 1.5-stroke HPD, the main exhaust event is deactivated; however, main intake valve events are not deactivated, and no additional intake lift events are provided to support the second CR event. The normal intake is provided for the first CR, and gases used in the second compression-release event are generated solely by the recirculation of exhaust manifold gases, without drawing air from the intake manifold. An example of such 1.5-stroke HPD valve actuation motions are illustrated in FIG. 1. As shown, the usual main exhaust valve actuation valve motions are lost (which would otherwise typically occur at approximately 180 to 300 degrees of crank angle in the illustrated example) and replaced with auxiliary valve actuation motions comprising two CR events 120 and two BGR events 122, 124. As further shown, unlike the main exhaust events, main intake valve events 134 are not lost but instead operate to provide gasses for a first CR event 120 (centered as 0 degrees crank angle in the illustrated example).

Given the requirement to continue main intake events during 1.5-stroke HPD engine braking, it is not feasible to rely on CDA mechanisms that would otherwise deactivate both exhaust and intake main events. To overcome this limitation, it is possible to provide independent control of each set of intake and exhaust valves through the provision of separate actuators for each set. For example, in a six-cylinder engine, this would require 12 separate actuators—six actuators for the intake valves and six actuators for the exhaust valves. Thus, during CDA operation, all twelve actuators would be operated to cause deactivation of all sets of intake and exhaust valves. Further, during 1.5-stroke HPD, the six actuators for the exhaust valves are operated to deactivate the exhaust valves, but the six actuators for the intake valves are operated to still permit actuation of the intake valves according to main valve events. While this configuration could work, the cost and space requirements incurred by providing separate actuators as well as the increased complexity of the system would be prohibitive.

Thus, systems and related methods implementing cooperative valve actuation motion sources without the above-noted drawbacks would represent an advancement of the art.

SUMMARY

Aspects of the disclosure provide a system for controlling valve motion that is particularly suited for engine environments that employ cylinder deactivation as well as high-power density (HPD) engine braking. A pulsing component may be provided for energizing a control valve in pulsatile fashion to create a transient pressure increase in a hydraulic passage and to cause deactivation of main event motion in at least one exhaust valve in one or more cylinders, while bypassing deactivation of main intake event motion and thereby preserving intake main event valve motion, and the use of such motion in the braking (i.e. 1.5 stroke HPD braking) operation, when engine braking is performed in combination with cylinder deactivation. The pulsing component may be implemented with an engine control unit that is adapted to provide pulsed energization to the control valve.

According to one aspect of the disclosure, a system for controlling valve motion to facilitate cylinder deactivation and high-power density (HPD) engine braking in an internal combustion engine having at least one cylinder may comprise: a valve set associated with the at least one cylinder, the valve set comprising at least one intake valve and at least one exhaust valve; a main event motion system configured to produce main event motion in the at least one intake valve and the at least one exhaust valve; an engine braking system configured to produce engine braking motion during an engine braking operation by adding motion to at least one of the exhaust valves; a deactivation system including respective deactivation mechanisms associated with the at least one intake valve and the at least one exhaust valve to selectively deactivate main event motion thereof, the deactivation system further including a control valve and at least one hydraulic link which provides hydraulic communication between the control valve and the deactivation mechanisms; wherein the deactivation system further includes a pulsing component adapted to energize the control valve to thereby cause a variation in the hydraulic pressure in the at least one hydraulic link during an engine cycle such that, when main exhaust event motion would otherwise occur, the hydraulic pressure in the at least one hydraulic link is sufficient to operate the deactivation mechanism associated with the at least one exhaust valve and main exhaust event motion is deactivated, and such that, when main intake event motion occurs, the hydraulic pressure in the at least one hydraulic link is insufficient to operate the deactivation mechanism associated with the at least one intake valve.

According to a further aspect, the pulsing component may be an engine control unit adapted to provide pulsed operation of the control valve. According to a further aspect, the intake deactivation mechanism is characterized by a deactivation avoidance window and the pulsing component is configured to provide a pulse of sufficient duration, or a pulse initiated at an appropriate time, such that the hydraulic pressure on the exhaust deactivation mechanism is maintained at an elevated level throughout the deactivation avoidance window. According to a further aspect, the main intake event motion of the at least one intake valve facilitates additional braking power in the cylinder. According to a further aspect the engine braking system is configured to produce at least two compression release events for each cycle of the internal combustion engine. According to a further aspect, the main event motion system comprises at least two valve bridges, and the deactivation mechanisms include collapsing mechanisms on the at least two valve bridges. According to a further aspect, the engine braking system comprises a dedicated brake rocker associated with at least one of the exhaust valves. According to a further aspect, the engine braking system comprises a brake solenoid valve arranged to control the flow of hydraulic fluid to produce braking motion in one or more valves in at least one valve set. According to a further aspect, the deactivation system is adapted to selectively deactivate the intake deactivation mechanism in one or more of the at least one cylinder depending on power needs from the engine.

According to a further aspect, the pulsing component is configured to adjust the pulse duration or timing based on the speed of the engine.

According to a further aspect of the disclosure, a method of controlling valve motion to facilitate cylinder deactivation and high-power density (HPD) engine braking in an internal combustion engine having at one cylinder, the system comprising a valve set associated with each of the at least one cylinder, each of the valve sets comprising at least one intake valve and at least one exhaust valve; a main event motion system for producing main event motion in each of the valve sets; an engine braking system for producing engine braking valve motion during an engine braking operation by adding motion to at least one of the exhaust valves; a cylinder deactivation system for selectively deactivating main event motion of the intake and exhaust valves in at least one valve set; and a pulsing component adapted to energize the control valve to thereby cause a variation in the hydraulic pressure in the at least one hydraulic link during an engine cycle such that, when main exhaust event motion would otherwise occur, the hydraulic pressure in the at least one hydraulic link is sufficient to operate the deactivation mechanism associated with the at least one exhaust valve and main exhaust event motion is deactivated, and such that, when main intake event motion occurs, the hydraulic pressure in the at least one hydraulic link is insufficient to operate the deactivation mechanism associated with the at least one intake valve, the method comprising: initiating a braking operation in the braking system for at least one of the valve sets; initiating a cylinder deactivation operation in the cylinder deactivation system, the cylinder deactivation operation tending to deactivate main event motion of at least one intake valve and at least one exhaust valve in the at least one valve set; and pulsing the control valve with the pulsing component such that main event motion of the at least one exhaust valve is deactivated while main event motion of the at least one intake valve is not deactivated.

According to a further aspect, the method of controlling valve motion may further comprise providing at least two compression release events for each cycle of the internal combustion engine. According to a further aspect, the method of controlling valve motion may include main event motion of the at least one intake valve that facilitates a compression release braking event performed in the braking operation.

According to a further aspect, system for controlling valve motion to facilitate cylinder deactivation and high-power density (HPD) engine braking in an internal combustion engine having at least one cylinder may comprise: a valve set associated with the at least one cylinder, the valve set comprising at least one intake valve and at least one exhaust valve; a main event motion system configured to produce main event motion in the at least one intake valve and the at least one exhaust valve; an engine braking system configured to produce engine braking motion during an engine braking operation by adding motion to at least one of the exhaust valves; a deactivation system including respective deactivators associated with the at least one intake valve and the at least one exhaust valve to selectively deactivate main event motion thereof, the deactivation system further including a deactivator controller and at least one communication link adapted to provide communication between the deactivator controller and the deactivators; wherein the deactivation system further includes a pulsing component adapted to provide a deactivation signal to the deactivators such that, for a given engine cycle, the deactivator associated with the at least one exhaust valve is deactivated, while the deactivator associated with the at least one intake valve is not deactivated.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION

Generally, the instant disclosure addresses the above-noted shortcomings. In particular, an internal combustion engine in accordance with the instant disclosure comprises a compression-release braking system capable of providing valve actuation motions implementing 2-stroke HPD engine braking as well as a cylinder deactivation system capable of deactivating intake and exhaust valve actuations. In operating the CR braking system and the CDA system, the instant disclosure further provides for preventing deactivation of intake valve actuations (despite operation of the CDA system) when it is desired to provide, for example, 1.5-stroke HPD engine braking. To this end, various system configurations comprising different numbers and/or arrangements and adaptations of actuators are described herein. Methods for operating such systems and synchronizing operation of such actuators are also described herein.

The embodiment described herein provide a techniques, systems and methods to facilitate operation of CDA and braking components while providing for a reduction in the number of actuators that would otherwise be required. Such systems and methods permit control activation/deactivation of paired intake and exhaust main events using a single actuator. In particular, the instant disclosure describes arrangements and adaptations for rapidly sequencing actuation of paired intake and exhaust valve sets so that when this sequence is timed correctly relative to engine operation (e.g., crankshaft rotational position/angle), a single actuator can selectively manage which valve (intake or exhaust) remains active and part of the engine cycle. In the described embodiments, the actuator (i.e., a high-speed solenoid control valve) may be controlled to deactivate the exhaust valve at a certain engine crankshaft rotational position or angle to achieve exhaust valve deactivation, but to prevent deactivation (i.e., preserve activation) of the intake valve. This process is repeated every engine cycle, with the actuator being controlled at certain engine crank positions to continually provide the desired exhaust valve deactivation/intake valve activation so long as 1.5-stroke HPD engine braking is desired.

Figure 2:
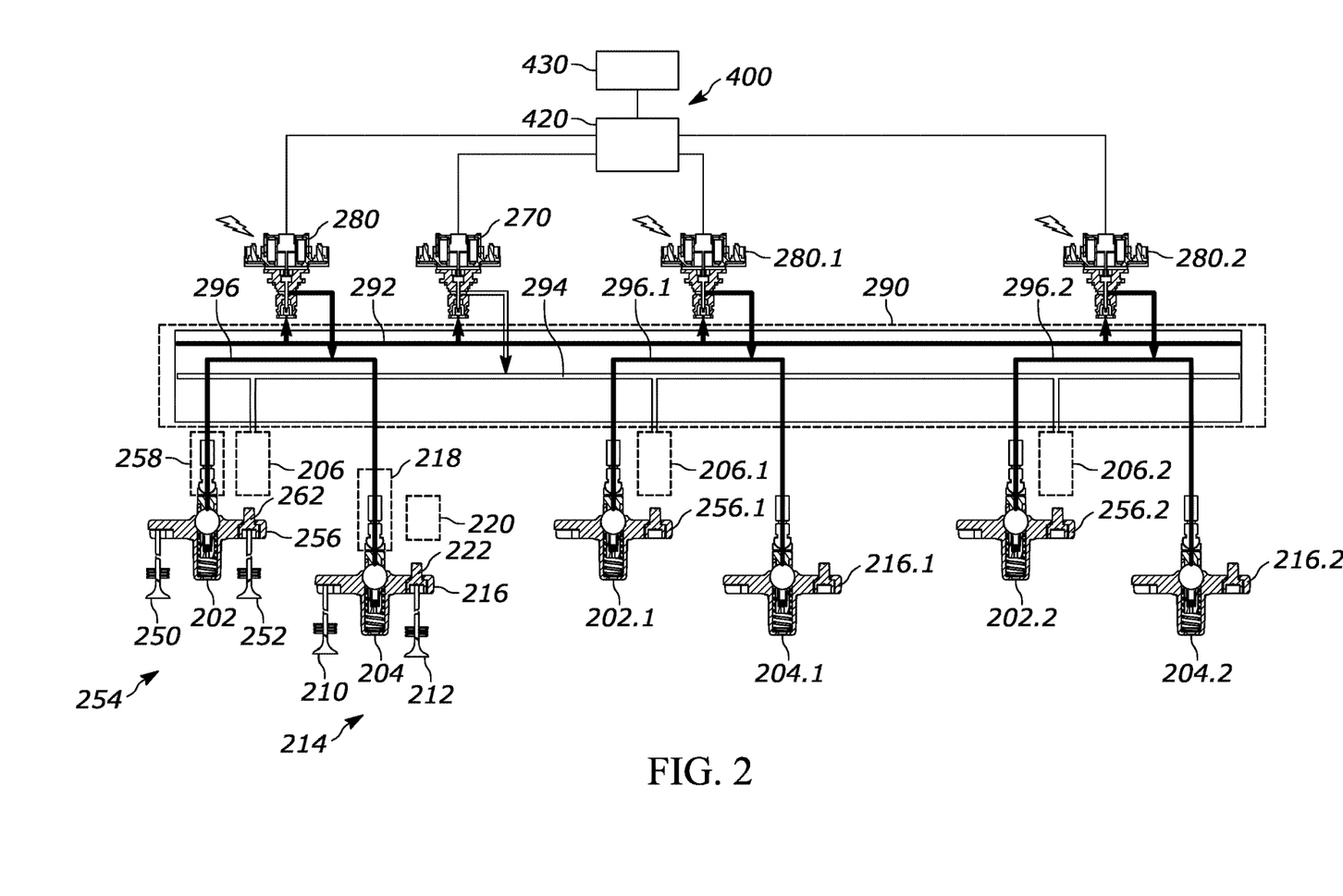
FIG. 2 is a schematic diagram of an example system and actuator sequencing method and technique according to an embodiment in accordance with the instant disclosure.
Figure 3:
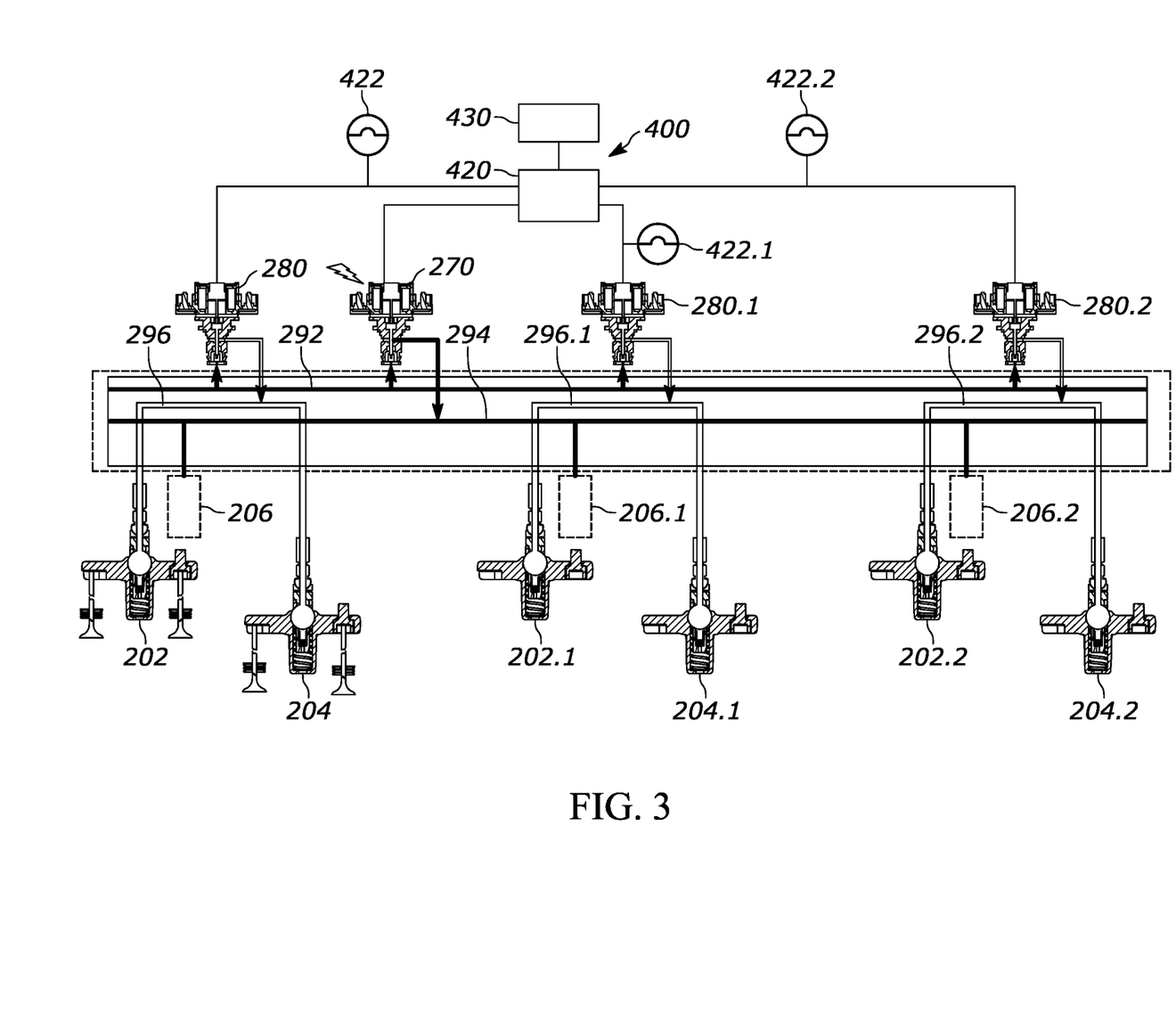
FIG. 3 is a schematic diagram illustrate a system and actuator sequencing technique and method according to a second embodiment in accordance with the instant disclosure.
Figure 4:
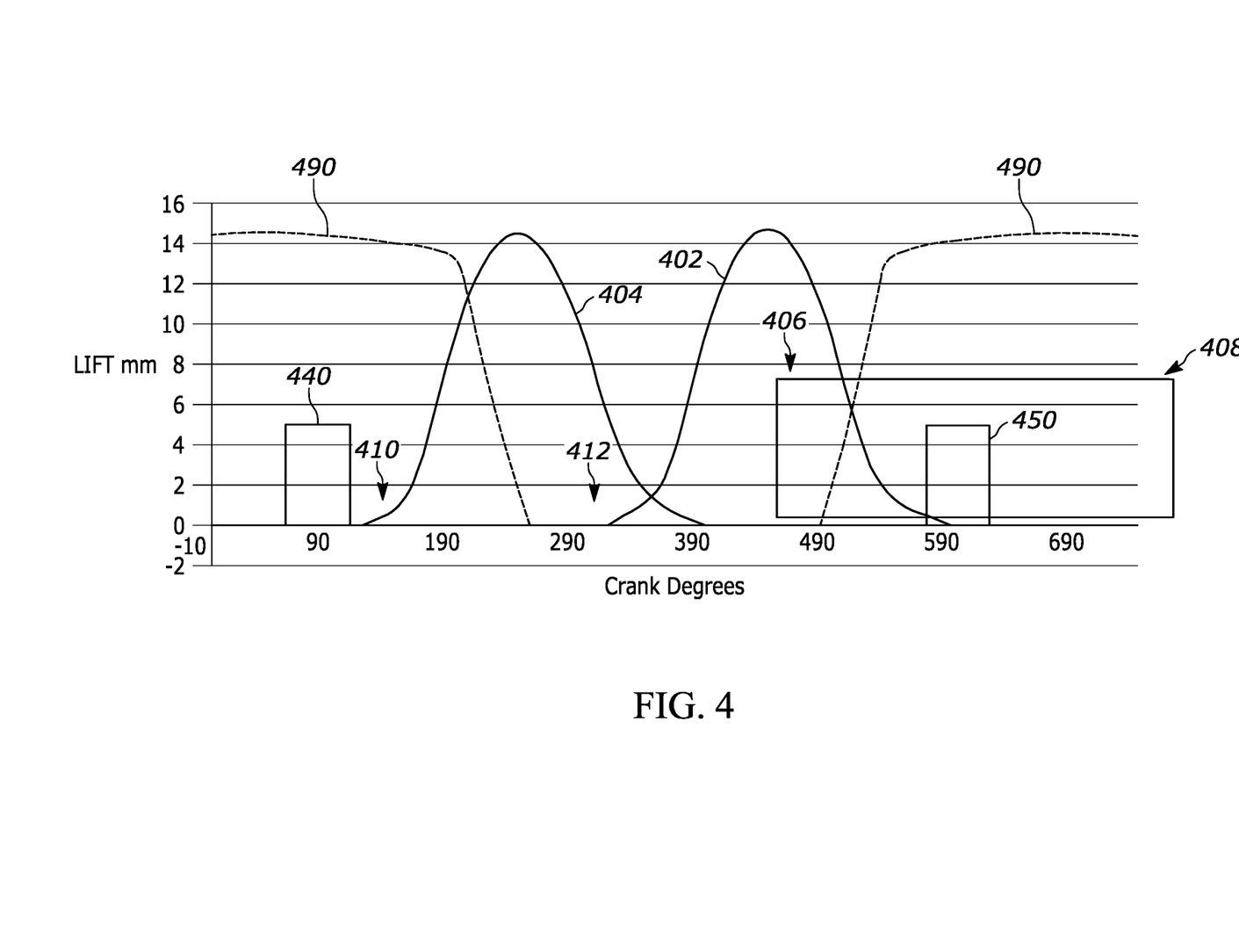
FIG. 4. is a graphical representation of a sequencing system, method and technique according to an aspect of the instant disclosure.
Figure 5:
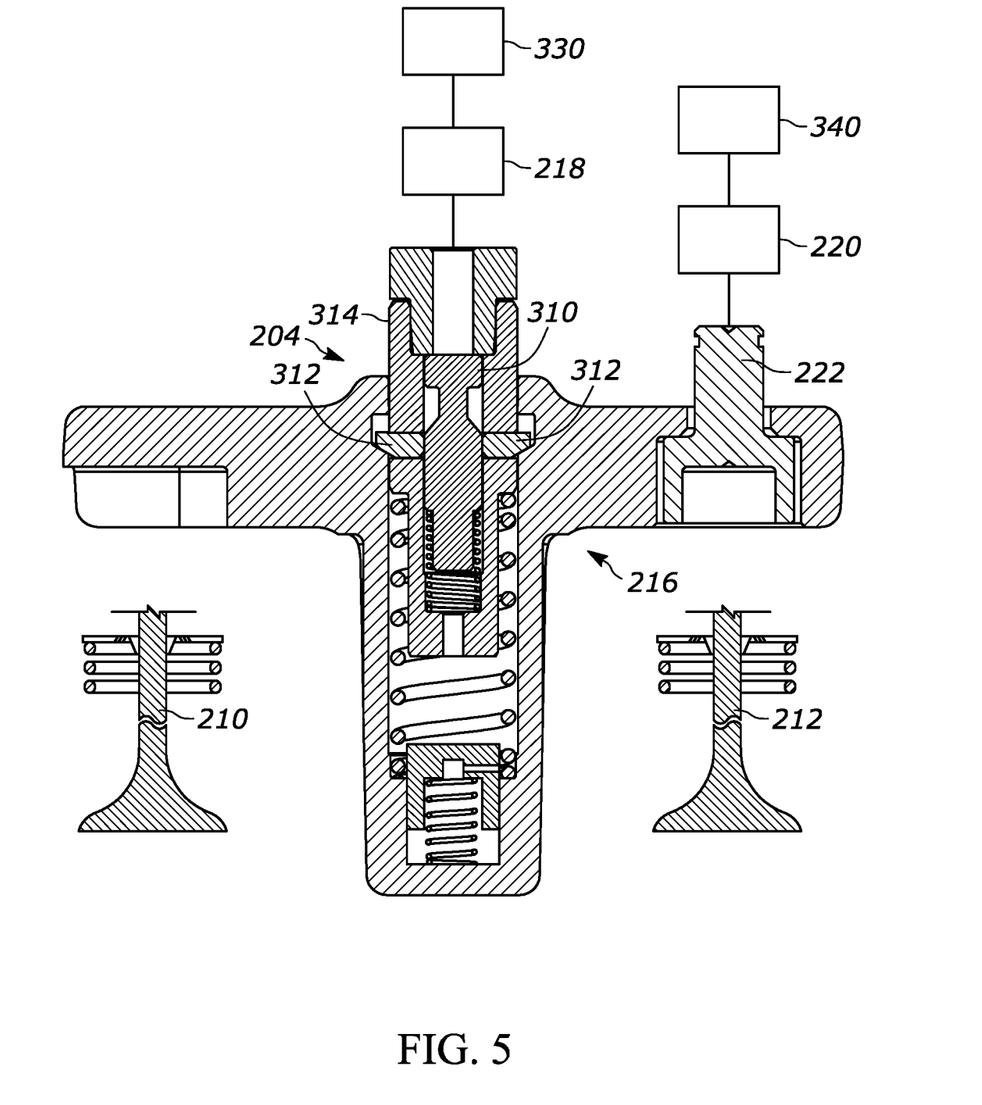
FIG. 5 illustrates an example deactivation mechanism or deactivator suitable for implementing aspects of the instant disclosure.

An embodiment in accordance with the instant disclosure is illustrated with reference to FIGS. 2-5. FIG. 5 shows relevant salient details of example key features of valve actuation system components, such as those described in U.S. Pat. No. 9,790,824, which will be useful for further understanding the systems that are schematically depicted in FIGS. 2-4. In these figures in which some components have been abbreviated (illustrated as functional blocks), or omitted, in favor of clarity in illustrating key aspects of the overall system. The entire disclosure of U.S. Pat. No. 9,790,824 is incorporated herein by reference.

As illustrated in FIGS. 2, 3 and 5, a valve set may be associated with each cylinder, wherein each valve set may include a pair of intake valves 210, 212, actuated by an intake valve bridge 216, and a pair of exhaust valves 250, 252, actuated by an exhaust valve bridge 256. Intake valves 210, 212 are actuated by an intake valve actuation system 214, which may comprise an intake valve bridge 216, which is driven by a main intake rocker 218 receiving motion from a motion source which may include a cam (schematically represented by 330 in FIG. 5). As will be recognized, the figures illustrate a three-cylinder engine environment, and decimals are used to denote like components on different engine cylinders. Thus, additional intake valve sets (although the valves are omitted for clarity in FIGS. 2 and 3) are associated with intake valve bridges 216.1 and 216.2, and additional exhaust valve sets are associated with exhaust valve bridges 256.1 and 256.2. Intake valve bridge 216 may include a collapsing or deactivating mechanism 204 integrated therein, for deactivating the intake valve bridge 216. An auxiliary intake rocker 220 (FIG. 5) may be driven by an auxiliary motion source, or cam 340 (FIG. 5), which may provide auxiliary motion to one of the intake valves 212 through an intake valve bridge pin 222, which may move independent of the intake valve bridge 216. The auxiliary rocker arm 220, which may be mounted on a rocker shaft (290 in FIGS. 2 and 3), may convey auxiliary motion from the auxiliary motion source 340 to the bridge pin 222 of the intake valve bridge 216 and to one of the intake valves 212. On 1.5 stroke HPD systems, however, the intake auxiliary motion components may be unnecessary and therefore eliminated. The deactivation mechanism, which may also be referred to as a "deactivator" herein, 204 may include an inner plunger 310 (FIG. 5), which may be displaced downward under hydraulic pressure to permit retraction of a pair of wedge elements 312, which, in turn, downward movement of an outer plunger 314 relative to and within the bridge 216.

As mentioned, for ease of illustration, each of FIGS. 2 and 3 illustrates components relevant to a three-cylinder engine environment. However, in practice, it is understood that the illustrated components could be applied to a greater or lesser number of cylinders, or that the components described herein could be replicated to control more cylinders not shown in the FIGs. Thus, for example, while three cylinders are illustrated in the instant examples, a system for use with a so-called inline six-cylinder engine could be achieved by simply replicating the illustrated systems for a second set of three cylinders.

As will be recognized, although FIG. 5 illustrates components in the context of an intake valve train, similar arrangements and components may be used for the exhaust valve train components illustrated at a high level in the figures. Exhaust valves may be actuated by an exhaust valve actuation system 254, which may comprise an exhaust valve bridge 256, which may be driven by a main exhaust rocker 258 which receives motion from a main exhaust motion source, such as a cam. Exhaust valve bridge 256 may include a collapsing or deactivating mechanism 202 integrated therein, for deactivating the exhaust valve bridge 256. An auxiliary exhaust rocker 206, which may be driven by a cam, may provide auxiliary (braking) motion to one of the exhaust valves 252 through an exhaust valve bridge pin 262, which may move independent of the exhaust valve bridge 256. The engine braking rocker arm 206 may be a dedicated rocker arm provided for each cylinder in conjunction with the exhaust valve 252 such that the braking rocker arm 206 can provide compression-release valve actuation motions (via a bridge pin 262 in the illustrated example) to the exhaust valve. It is assumed throughout this disclosure that each braking rocker arm 206 may be associated with an auxiliary actuation motion source (similar to the cam 340 represented in FIG. 5) capable of providing HPD engine braking valve actuation motions, i.e., two CR events and one or more additional events.

As will be recognized, and explained in further detail below, when the deactivation mechanisms 204, 202 of the intake valve bridge 216 and exhaust valve bridge 256, respectively, are not deactivated (i.e., when hydraulic fluid is not provided to the deactivation mechanisms 204 and 202, respectively), intake valve actuation system 214 and exhaust valve actuation system 254 may function, at least in part, as a main event motion system which provides main event motion to intake valves 210, 212 and exhaust valves 250, 252 to facilitate main event operation (i.e., a positive power mode) of an associated engine cylinder. When the deactivation mechanisms 204, 202 are deactivated (i.e., when hydraulic fluid at suitable pressure and/or flow is provided to the deactivation mechanisms), intake valve actuation system 214 and exhaust valve actuation system 254 may function to convey auxiliary motions to the respective intake and exhaust valves, or may not convey any motion to the valves, in the case of cylinder deactivation.

As will be readily recognized from the instant disclosure, control of the operation of the intake valve actuation system 214 and exhaust valve actuation system 254 may be implemented through one or more high-speed control solenoid valves and a network of hydraulic links or passages within the various valve train components to provide a hydraulic network or circuit through which the control valves may control the intake and exhaust valve actuation systems 214, 254. Throughout the figures of the instant disclosure, the convention has been adopted whereby hydraulic links or passages depicted by thick solid lines represent a state in which hydraulic passages depicted by such lines are charged with sufficient pressure and/or flow of hydraulic fluid to operate downstream components, which may be considered an "on" signal communication via the hydraulic passages or links, whereas hydraulic links or passages depicted in outline, or thin parallel lines, illustrate a state in which hydraulic passages depicted by such lines are not sufficiently charged with pressure and/or flow of hydraulic fluid to operate downstream components, which may be considered an "off" signal communication via the hydraulic passages or links.

Rocker shaft, represented by dotted outline 290, may house a number of hydraulic passages, which may constitute hydraulic links or circuits for operating various components of the valve actuation systems. An engine braking system may include an engine braking solenoid valve 270 which may be arranged and adapted to receive hydraulic fluid from a constant pressure/flow hydraulic supply passage 292, which may be provided in the rocker shaft and supplied with hydraulic fluid by an upstream pump (not shown). In accordance with aspects of the disclosure, operation of braking rocker arms 206, 206.1 and 206.2 may be controlled with a single braking actuator or solenoid valve 270. Braking solenoid valve 270 may be a high-speed solenoid valve and may control the flow of hydraulic fluid in a braking hydraulic link or passage 294, based on electronic signals from an engine control unit (ECU) 420. Passage 294 may communicate hydraulically through flow passages that branch from it and are provided in downstream valvetrain components, such as the braking rocker arm 206, to provide braking motion via bridge pin 262 to the braking exhaust valve 252, for example. The details of the hydraulic passages and control components that facilitate braking motion may be similar to those as described in FIG. 5, and further in U.S. Pat. No. 9,790,824. As will be recognized from the instant disclosure, the engine braking system may include control of engine braking in a number of cylinders, each having respective braking valvetrain components, such as braking rockers 206.1 and 206.2, each of which communicates with the braking hydraulic passage 294 in the rocker shaft 290, and each receiving a braking control signal, in the form of hydraulic flow and/or pressure in braking hydraulic passage 294, the flow and/or pressure of which may be controlled by the braking solenoid valve 270.

Thus, a dedicated engine braking rocker arm 206, 206.1 and 206.2 is provided for each cylinder in conjunction with an exhaust valve such that the braking rocker arm 206 can provide compression-release valve actuation motions (via a bridge pin in the illustrated example) to the exhaust valve. It is assumed throughout this disclosure that each braking rocker arm 206 may be associated with an auxiliary actuation motion source (i.e., similar to 340 in FIG. 5) capable of providing 2-stroke HPD engine braking valve actuation motions, i.e., two CR events and one or more additional air supplying events.

Cylinder deactivation of one or more cylinders may be controlled with a cylinder deactivation system, which may include a number of CDA solenoid valves 280, 280.1 and 280.2 each of which is arranged and adapted receive hydraulic fluid from hydraulic supply passage 292 in the rocker shaft 290. CDA solenoid valves 280, 280.1 and 280.2 may be high-speed solenoid valves and may control, based on electronic signals from an engine control unit 420, the flow of hydraulic fluid in a respective, designated CDA hydraulic link or passage 296, 296.1 and 296.2, each of which communicates with respective valvetrain components for a valve set for each cylinder, such as the intake valve bridges 216, 216.1 and 216.1, and respective exhaust valve bridges 256, 256.1 and 256.2, and with the respective collapsing or deactivating mechanisms 204, 204.1 and 204.2 and 202, 202.1 and 202.2. Thus, CDA solenoid valves 280, 280.1 and 280.2 may control activation and deactivation of respective, paired deactivating mechanisms for each cylinder, each of the CDA solenoid valves being common to respective paired valve sets, cooperating with respective intake and exhaust valve bridges, for each cylinder.

As shown in FIG. 2, the CDA solenoids 280, 280.1 and 280.2 are energized and the HPD brake solenoid 270 is not energized. In this state, the braking rocker arms 206 are controlled to lose any braking actuation motions applied thereto (i.e., no compression-release engine braking). Consequently, the energized CDA solenoid valves 280, 280.1, 280.2 permit hydraulic fluid to flow to each of the deactivation mechanisms 202, 204, thereby unlocking them such that all of the intake and exhaust valves are deactivated, and the cylinders are deactivated (i.e., no positive power is generated).

As shown in FIG. 2, cylinder deactivation may be provided when all three, or one or more of the CDA solenoids are energized, and the HPD brake solenoid is not energized. In this state, the braking rocker arms 206 are controlled to lose any braking actuation motions applied thereto (i.e., no compression-release engine braking). Consequently, the energized CDA solenoids 280, 280.1 and 280.2 permit hydraulic fluid to flow to each of the respective deactivation mechanisms, 202, 204, 202.1, 204.1, 204.1 and 204.2, thereby unlocking them such that all of the intake and exhaust valves for the respective cylinders are deactivated. As will be recognized from the instant disclosure, while FIG. 2 illustrates all three depicted CDA solenoids being simultaneously activated, this is not a requirement. That is, some number of CDA solenoids less than all of them may be energized to provide a lesser level of cylinder deactivation. In this manner, levels of cylinder deactivation may be dynamically controlled, for example, based on sensed engine parameters, such as crankshaft speed, engine operating temperature, manifold pressure or other parameters, and appropriate signals to and from the engine control unit 420.

Those skilled in the art will appreciate that other mechanisms capable of deactivating intake and/or exhaust valve actuation motions are known in the art and the instant disclosure is not limited in this regard. In the context of the examples described in this disclosure, the deactivation mechanisms 202, 204 may be configured to have a "locked" state when hydraulic fluid is not supplied thereto such that valve actuation motions are conveyed through the deactivation mechanism to the corresponding engine valves. On the other hand, the deactivation mechanisms 202, 204 may have an "unlocked" configuration when hydraulic fluid is provided to thereto such that that valve actuation motions are not conveyed through the deactivation mechanism to the corresponding engine valves, i.e., the actuation motions are lost, and the corresponding engine valves and associated motions are deactivated. However, those skilled in the art will appreciated that the example configurations may be modified such that control of the locked and unlocked states of the deactivation mechanisms 202, 204 can be reversed. In this latter case, providing hydraulic fluid (or hydraulic pressure/flow) to the deactivation mechanisms 202, 204 may cause the deactivation mechanisms 202, 204 to assume a locked state and vice versa, although such additional adaptations may present challenges, for example, with engine starting that may need to be addressed.

According to aspects of the instant disclosure, the cylinder deactivation system may be provided with the capability to preserve main intake event valve motion and thus achieve the benefits of HPD braking even when cylinder deactivation is in effect. To this end, the cylinder deactivation system may include a include a deactivator controller implemented as part of the ECU 420 in the form of a pulsing component 400 (FIGS. 2 and 3) which may provide for energizing of one or more of the CDA solenoid control valve 280, 280.1 and 280.2 in pulsatile fashion. The pulsing component 400 may be implemented using the engine control unit 420, which communicates electronic control signals through electrical links to each of the CDA solenoid valves 280, 280.1 and 280.2. ECU 420 may be a processor-based control unit, which includes memory for storing information representing instructions, as well as a processing device for executing the stored instructions. ECU 420 may receive signals from one or more engine sensors, collectively represented by 430, through appropriate interfaces. Sensors 430 may include sensors for, or relating to, various engine parameters, including crankshaft or camshaft rotational position, crankshaft or camshaft rotational speed, and other parameters.

According to aspects of the disclosure, when HPD engine braking is desired to be invoked, in addition to energizing the HPD braking solenoid 270 (as shown in FIG. 3), one or more of the CDA solenoids 280, 280.1 and 280.2 may be energized in pulsatile fashion, represented by pulsed signals 422, 422.1 and 422.2, by the deactivator controller/pulsing component 400 to preserve main event intake valve motion while deactivating main event exhaust valve motion for a given engine cycle, and for a one or more cylinders and associated intake/exhaust valve pair. Generally, pulsed control of a CDA solenoid (i.e., 280) may result in a rapid transient pressure increase or "spike," within the associated hydraulic link or passages (i.e., 296) that communicate with the intake and exhaust deactivation mechanisms (i.e., 204, 202). This transient pressure spike may be sized and timed appropriately so that the deactivation of the exhaust main event motion occurs (exhaust main event motion is lost), while deactivation of the intake main event motion does not occur (intake main event motion is preserved). Thus, main event intake valve motion may be used in the engine cycle to support HPD braking.

FIG. 4 is a graphical representation of pulse timing and valve motion as a function of engine crankshaft rotational position in an example system and according to an example method relating to aspects of the disclosure. FIG. 4 also depicts an example pressure variation as a function of engine crankshaft rotational position. FIG. 4 illustrates sequencing for a single cylinder. It will be understood that similar sequencing may be implemented for additional cylinders. CDA solenoid 280 may be energized with a control pulse from the pulsing component 400 during a window of time starting at 406, which may, for example, be proximate engine crankshaft rotational position corresponding to the mid-point (i.e., maximum lift) of the intake valve main event 402 and terminating at 408 prior to onset of the next exhaust valve main event motion 404. Pulsed activation of the CDA solenoid 280 may result in a pressure increase, represented by dotted line 490, within the hydraulic network (i.e., including passage 296) linking the CDA solenoid valve 280 to the paired deactivation mechanisms 202, 204.

Owing to the structure of the deactivation mechanisms 202, 204 (FIGS. 2, 3 and 5), and their interaction with other valve train components (rockers, cams and valve springs), it may be preferable in the implementation of the system to avoid energization or de-energization of the solenoid control valve during certain windows of time (or crankshaft position) when the deactivation mechanisms may be in a state where they may react unpredictably to pressure changes. Such windows, for purposes of this disclosure, will be termed "avoidance windows." That is, it may be preferable to initiate pulsing at a point in time that the hydraulic pressure is not so low that it results in unpredictable operation of the deactivation mechanisms. For example, intake deactivation avoidance window 440 may represent a window or zone in which the attempted deactivation (or reactivation) of the intake deactivation mechanism 204 (FIGS. 2 and 3) is to be avoided, and exhaust deactivation avoidance window 450 may represent a window or zone in which attempted deactivation of the exhaust deactivation mechanism is to be avoided. These avoidance zones represent regions where it may be undesirable to initiate deactivation (i.e., to energize or de-energize the solenoid control valve) because the hydraulic pressure may be so low that collapse or re-locking of the deactivation mechanism cannot be dependably predicted. These avoidance windows or zones may also shift as a function of engine speed and response times. As will be recognized from the instant disclosure, energization at the beginning of the intake main event 402 is safe because intake motion has begun, and deactivation/collapse of the intake deactivation mechanism cannot occur. Initialization of the control pulse 406 can be at the peak of intake main event, as described above. However, there may be loss of a portion of the intake main event valve lift—the portion from the onset 412 to the peak lift, that could otherwise be helpful in controlling operation. Thus, optimization can be undertaken for a particular system configuration where the avoidance windows can be considered in the control of the timing and duration of the control pulse. For example, energization can take place anywhere on the right side of the window 440 and intake deactivation will not occur. Likewise, energization could occur as late as the left side of window 450 and exhaust deactivation may still occur. Energizing between the right of 440 and the left of 450 will not deactivate intake, but will deactivate exhaust. When energizing inside of window 450, the exhaust may or may not collapse, and operating the right of 450, the exhaust will not collapse. These ranges may be factored into suitable control routines/algorithms in the ECU to provide for optimal operation.

As shown in FIG. 4 by the dashed curve 490, the pulsed energization of one or more of the CDA solenoid valves in the pulse window 406, 408 results in a corresponding step increase in hydraulic fluid supply pressure in the hydraulic link or passage (i.e., 296 in FIG. 2) communicating with deactivation mechanisms 202, 204, with the pressure, in this example, ramping up rapidly from about 490 degrees of crankshaft position to about 540 degrees, then remaining elevated as the crankshaft undergoes rotation through 690 degrees and continuing to about 190 (on the left portion of the graph in FIG. 4) to past the onset 410 of the exhaust main event and then decreasing rapidly from about 190 to 250 degrees of crankshaft rotational position. The magnitude of the pressure increase is such that it is above the required threshold hydraulic pressure for operating the deactivation mechanisms. Because this increase hydraulic fluid supply pressure is present at a time proximate the onset 410 of the main exhaust event 404, the exhaust deactivation mechanism 202 is unlocked such that the main exhaust event is lost. On the other hand, at that point in time at which onset 412 of the intake main event occurs, the spike in hydraulic fluid supply pressure will have decreased sufficiently below a threshold required for operating the deactivation mechanisms, so as to ensure locking of the intake deactivation mechanism 204, thereby resulting in conveyance of the intake main event. As will be recognized, the pulsing control for any additional CDA control valves (i.e., 280.1 and 280.2) would be appropriately shifted as a function of the crankshaft rotational position such that the same pulsed sequencing occurs for the exhaust and intake main events associated with those additional control valves/cylinders.

With regard to the intake deactivation avoidance window 440 and exhaust deactivation avoidance window 450 described above, it will be recognized from the instant disclosure that the pressure variation 490 is such that the pressure remains at an elevated level throughout the occurrence (or passing) of the each of these windows, and within a safe margin. Thus, dependable activation and deactivation can be achieved, and instances where the deactivation mechanism operation might be unpredictable (i.e., from insufficient hydraulic pressure) can be avoided.

Thus, by utilizing controlled pulse of the CDA control valve 280, synchronized appropriately with the onset of exhaust and intake main event motion, deactivation of the intake main event valve motion may be skipped or bypassed, while deactivation of exhaust main event motion is preserved. As a result, the intake valve main event motion that is useful for achieving HPD engine braking can be preserved and implemented in combination with cylinder deactivation features in an engine environment. As will be recognized from the instant disclosure, a single CDA control valve can be utilized to achieve appropriate control of both the intake and exhaust valves in such an environment. For example, the above-described technique has the advantage of requiring only four actuators (three CDA control valves and one braking control valve) total to provide CDA and HPD engine braking operation for three cylinders. In a six-cylinder environment, for example, only eight actuators would be needed.

Thus, the pulsatile operation of the CDA control valves may cause a variation in the hydraulic pressure in the at least one hydraulic link during at least one engine cycle such that when main exhaust event motion would otherwise occur, the hydraulic pressure in the at least one hydraulic link is sufficient to operate the deactivation mechanism associated with the at least one exhaust valve and main exhaust event motion is deactivated and when main intake event motion occurs, the hydraulic pressure in the at least one hydraulic link is insufficient to operate the deactivation mechanism associated with the at least one intake valve.

As will be recognized from the instant disclosure by those of ordinary skill in the art, although the control systems are shown in the above examples using hydraulic linkages and communications via hydraulic passages to the various control components, other implementations contemplated by this disclosure may include control by "wire" implementations, where the hydraulic links described above are replaced with electronic signal carriers (wires or conductors) and suitable control components, such as electromagnetic actuators, are provided locally on or in cooperation with one or more of the deactivation mechanisms, for example. More specifically, the deactivation components, such as the inner plunger 310 illustrated in FIG. 5, may be adapted with a mechanical linkage to be operated with an electromagnetic actuator arranged on or near the valve bridge 216. Similarly, other deactivation/collapsing mechanisms situated on other valve train components, rocker arms, may be actuated with electromagnetic elements that communicate with the ECU directly via wire/conductor. Such wired systems may have the advantage of improved responsiveness (i.e., less signal lag) than the hydraulic links/networks described above.

Although the present implementations have been described with reference to specific example embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A system for controlling valve motion to facilitate cylinder deactivation and high-power density (HPD) engine braking in an internal combustion engine having at least one cylinder, the system comprising:

a valve set associated with the at least one cylinder, the valve set comprising at least one intake valve and at least one exhaust valve;

a main event motion system configured to produce main event motion in the at least one intake valve and the at least one exhaust valve;

an engine braking system configured to produce engine braking motion during an engine braking operation by adding motion to at least one of the exhaust valves;

a deactivation system including respective deactivation mechanisms associated with the at least one intake valve and the at least one exhaust valve to selectively deactivate main event motion thereof, the deactivation system further including a control valve and at least one hydraulic link which provides hydraulic communication between the control valve and the deactivation mechanisms;

wherein the deactivation system further includes a pulsing component adapted to energize the control valve to thereby cause a variation in the hydraulic pressure in the at least one hydraulic link during an engine cycle such that, when main exhaust event motion would otherwise occur, the hydraulic pressure in the at least one hydraulic link is sufficient to operate the deactivation mechanism associated with the at least one exhaust valve and main exhaust event motion is deactivated, and such that, when main intake event motion occurs, the hydraulic pressure in the at least one hydraulic link is insufficient to operate the deactivation mechanism associated with the at least one intake valve.

2. The system of claim 1, wherein the pulsing component is an engine control unit adapted to provide pulsed operation of the control valve.

3. The system of claim 1, wherein the exhaust deactivation mechanism is characterized by a deactivation avoidance window and wherein the pulsing component is configured to provide a pulse of sufficient duration, or a pulse initiated at an appropriate time, such that the hydraulic pressure on the exhaust deactivation mechanism is maintained at an elevated level throughout the deactivation avoidance window.

4. The system of claim 1, wherein the main intake event motion of the at least one intake valve facilitates additional braking power in the cylinder.

5. The system of claim 1, wherein the engine braking system is configured to produce at least two compression release events for each cycle of the internal combustion engine.

6. The system of claim 1, wherein the main event motion system comprises at least two valve bridges, and wherein the deactivation mechanisms include collapsing mechanisms on the at least two valve bridges.

7. The system of claim 1, wherein the engine braking system comprises a dedicated brake rocker associated with at least one of the exhaust valves.

8. The system of claim 1, wherein the engine braking system comprises a brake solenoid valve arranged to control the flow of hydraulic fluid to produce braking motion in one or more valves in the at least one valve set.

9. The system of claim 1, wherein the deactivation system is adapted to selectively deactivate the intake deactivation mechanism in one or more of the at least one cylinder depending on power needs from the engine.

10. The system of claim 1 wherein the pulsing component is configured to adjust the pulse duration or timing based on the speed of the engine.

11. A method of controlling valve motion to facilitate cylinder deactivation and high-power density (HPD) engine braking in an internal combustion engine having at least one cylinders, the system comprising a valve set associated with each of the at least one cylinder, each of the valve sets comprising at least one intake valve and at least one exhaust valve;

a main event motion system for producing main event motion in each of the valve sets;

an engine braking system for producing engine braking valve motion during an engine braking operation by adding motion to at least one of the exhaust valves; a cylinder deactivation system including deactivators for selectively deactivating main event motion of the intake and exhaust valves in at least one valve set; and a deactivating controller adapted to control the deactivators such that, when main exhaust event motion would otherwise occur, main exhaust event motion is deactivated, and such that, when main intake event motion is not deactivated, the method comprising:

initiating a braking operation in the braking system for at least one of the valve sets;

initiating a cylinder deactivation operation in the cylinder deactivation system, the cylinder deactivation operation tending to deactivate main event motion of at least one intake valve and at least one exhaust valve in the at least one valve set;

pulsing the control valve with the deactivator controller such that main event motion of the at least one exhaust valve is deactivated while main event motion of the at least one intake valve is not deactivated.

12. The method of claim 11, further comprising providing at least two compression release events for each cycle of the internal combustion engine.

13. The method of claim 12, wherein the main event motion of the at least one intake valve facilitates a compression release braking event performed in the braking operation.

14. A system for controlling valve motion to facilitate cylinder deactivation and high-power density (HPD) engine braking in an internal combustion engine having at least one cylinder, the system comprising:

a valve set associated with the at least one cylinder, the valve set comprising at least one intake valve and at least one exhaust valve;

a main event motion system configured to produce main event motion in the at least one intake valve and the at least one exhaust valve;

an engine braking system configured to produce engine braking motion during an engine braking operation by adding motion to at least one of the exhaust valves;

a deactivation system including respective deactivators associated with the at least one intake valve and the at least one exhaust valve to selectively deactivate main event motion thereof, the deactivation system further including a deactivator controller and at least one communication link adapted to provide communication between the deactivator controller and the deactivators;

wherein the deactivation system further includes a pulsing component adapted to provide a deactivation signal to the deactivators such that, for a given engine cycle, the deactivator associated with the at least one exhaust valve is deactivated, while the deactivator associated with the at least one intake valve is not deactivated.

* * * * *